Jan. 3, 1961     I. R. LANG     2,966,951
POWER-OPERATED GOLFER'S VEHICLE
Filed March 25, 1959     2 Sheets-Sheet 1
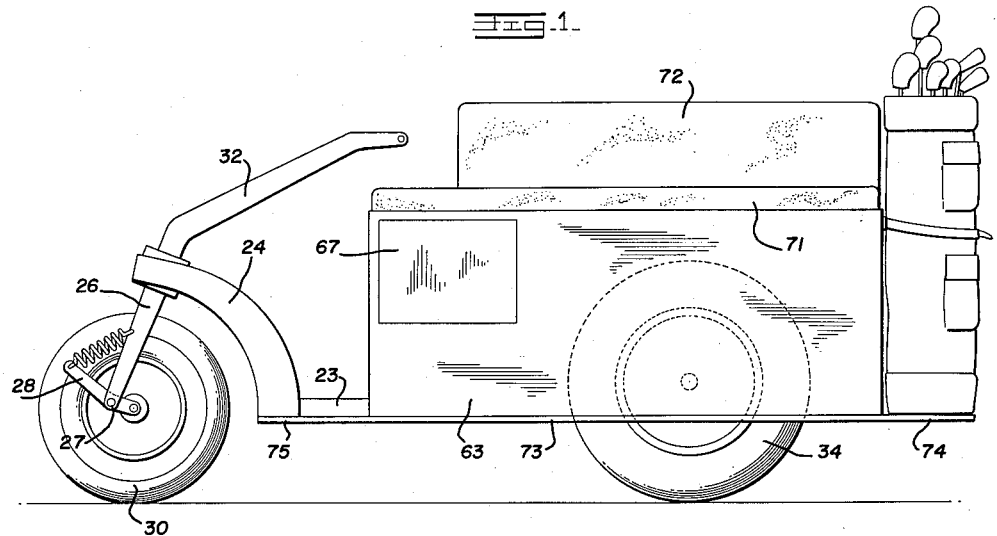
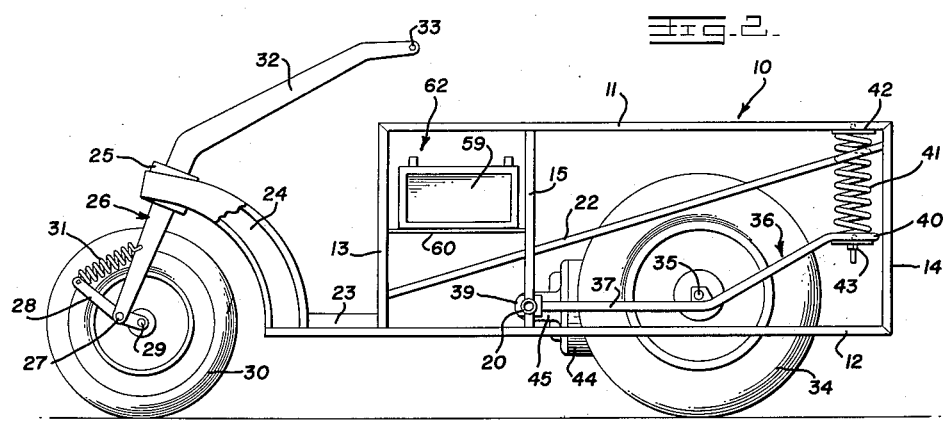
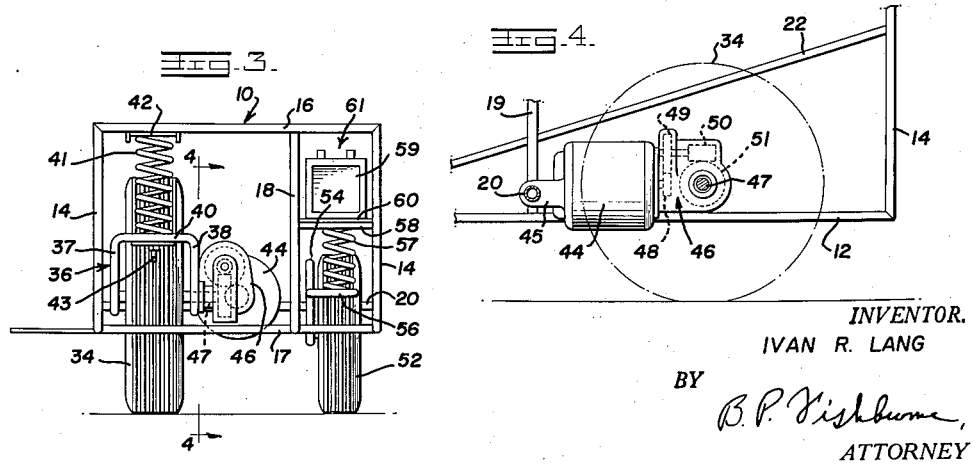
INVENTOR.
IVAN R. LANG
BY
*B. P. Fishburne, Jr.*
ATTORNEY

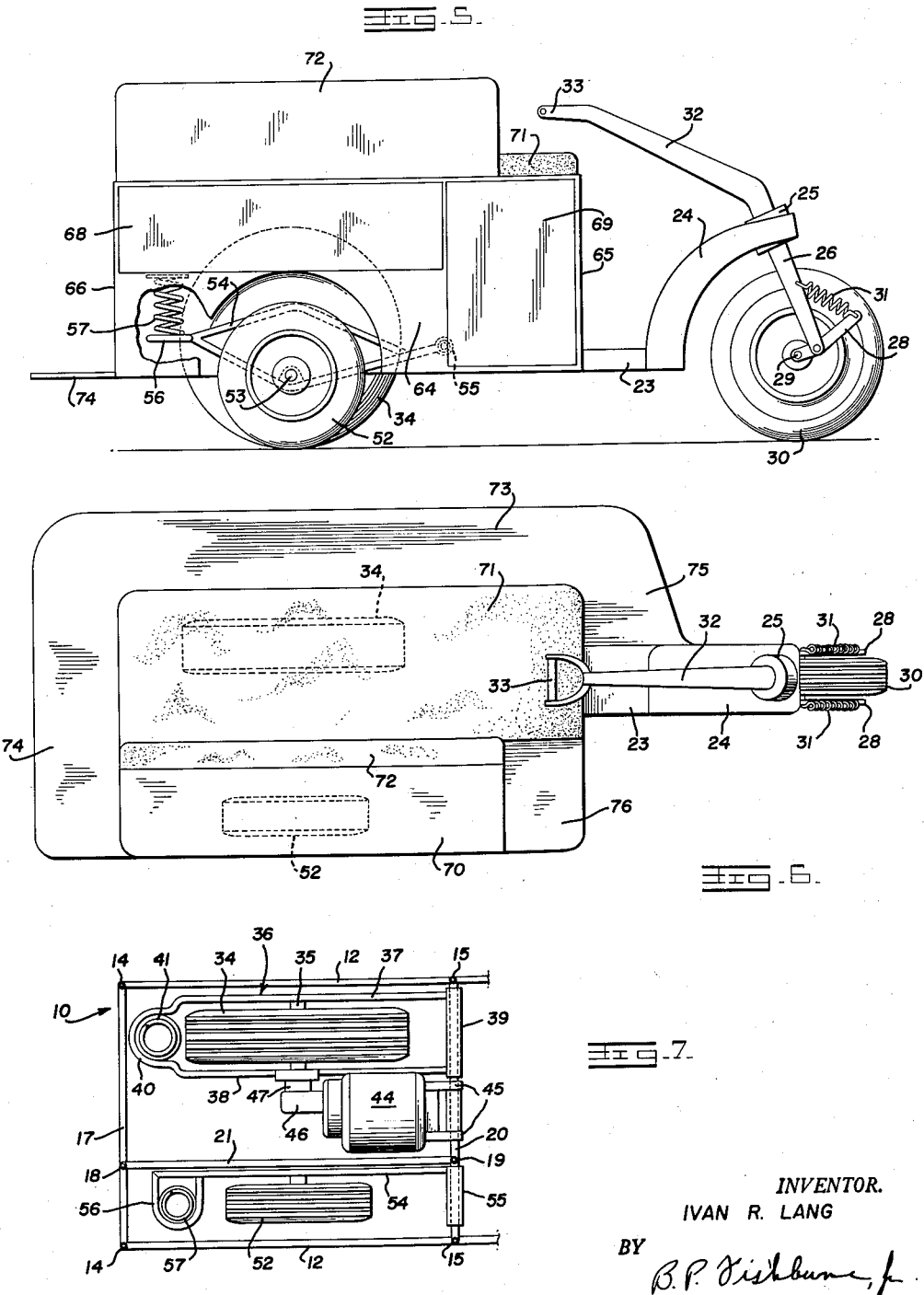

United States Patent Office 2,966,951
Patented Jan. 3, 1961

2,966,951

POWER-OPERATED GOLFER'S VEHICLE

Ivan R. Lang, 255 Glendora, Long Beach, Calif.

Filed Mar. 25, 1959, Ser. No. 801,750

2 Claims. (Cl. 180—25)

This invention relates to a vehicle for golfers.

A primary object of the invention is to provide a power-operated golfer's vehicle of improved and simplified design and including a novel seating arrangement which enables the golfer to board and leave the vehicle in a more convenient and expeditious manner than is possible with golfers' vehicles of conventional design.

A further important object of the invention is to provide a golfer's vehicle of the type powered by electricity, and having a greatly simplified power transmission to a single large traction wheel with an oversize balloon tire mounted thereon, to thereby prevent the vehicle from digging up or damaging the turf of the golf course, and enabling the vehicle to be propelled with increased efficiency.

Another object of the invention is to provide an electric powered golfer's vehicle having a three wheeled chassis, and including novel and simplified means for independently suspending the wheels in such a manner that the need for differential gears is dispensed with, and the vehicle is well balanced, stable, comfortable and very easy to steer.

Another object is to provide a golfer's vehicle of the above-mentioned type which utilizes a minimum number of parts in its electrical drive means, in which the electrical drive means are connected with the single traction wheel and the frame of the vehicle in a novel manner which permits the drive means to move with the traction wheel as the latter passes over irregularities in the ground.

A further object of the invention is to provide a golfer's vehicle which may be boarded by the golfer from the side, front or rear end thereof, and which also is constructed to conveniently support one or several golf bags.

Still another object of the invention is to provide an electric powered golfer's vehicle which is very compact in construction, sturdy and durable and easy to service or maintain.

Other objects and advantages of the invention will become apparent during the course of the following detailed description.

In the accompanying drawings forming a part of this application and in which like numerals are employed to designate like parts throughout the same, Figure 1 is a side elevation of a golfer's vehicle in accordance with the invention.

Figure 2 is a further side elevation of the vehicle with the seat structure, side paneling and running board removed, to show the framework of the vehicle, wheel suspension means and electric drive.

Figure 3 is a rear elevation of the vehicle as shown in Figure 2, parts omitted.

Figure 4 is a fragmentary vertical section taken on line 4—4 of Figure 3.

Figure 5 is a side elevation showing the opposite side of the vehicle from the side shown in Figure 1, parts broken away.

Figure 6 is a plan view of the vehicle.

Figure 7 is a fragmentary plan view of the drive and wheel suspension means of the vehicle.

In the drawings, wherein for the purpose of illustration is shown a preferred embodiment of the invention, the numeral 10 designates generally a rigid frame which may be conveniently formed of welded metal tubing, or the like. The frame 10 is rectangular in its overall shape and comprises upper and lower horizontal longitudinal frame bars 11 and 12, rigidly connected at their ends by vertical frame bars 13 and 14. Additional vertical frame bars 15 rigidly interconnect the upper and lower bars 11 and 12 intermediate their ends, and the vertical bars 15 are disposed near and rearwardly of the vertical bars 13 as best shown in Figure 2. The frame 10 also comprises upper and lower horizontal transverse frame bars 16 and 17, at the front and rear thereof, rigidly secured by welding or the like to the vertical bars 13 and 14 and the longitudinal bars 11 and 12.

An additional pair of vertical frame bars 18 and 19 are disposed near and inwardly of the vertical bars 14 and 15, Figure 7, and the ends of the bar 18 are rigidly connected with the horizontal transverse bars 16 and 17, as shown. Adjacent the vertical frame bars 15 and 19, Figures 2 and 7, a horizontal bar or frame member 20 extends transversely of the frame 10, slightly above the elevation of the longitudinal frame bars 12, and the opposite ends of the horizontal member 20 are rigid with the vertical bars 15. The lower end of the vertical bar 19 is rigidly secured to the transverse member 20, Figure 7, and the upper end of the vertical bar 19 is similarly rigidly secured to a transverse horizontal frame bar extending between and interconnecting the upper longitudinal bars 11.

The frame 10 may further comprise an additional horizontal longitudinal bar 21, Figure 7, having its ends rigidly secured to the bottoms of the vertical bars 18 and 19, and the frame may be provided with a diagonal brace 22, as shown in Figure 2, rigid with the bars 13, 14 and 15 at one side of the frame 10. Additional brace bars, not shown, may be incorporated in the frame 10 at advantageous points to strengthen it.

The frame 10 has a forward extension 23, rigid therewith, at the elevation of the lower bars 12, and an upwardly and forwardly curved steering yoke 24 is rigidly secured to the forward end of the frame extension 23, and has its lower end spaced forwardly of the vertical frame bars 13. The forward portion of the yoke 24 is spaced a considerable distance above and forwardly of the frame extension 23, and the forward portion of the yoke 24 carries a bearing 25 having journaled therein a steering fork 26, inclined rearwardly from the vertical as shown. The steering fork 26 has pivotally secured to its lower extremities, as at 27, a pair of bell cranks 28, carrying a horizontal axle 29 for a front pneumatic tired wheel 30, which is the steering wheel of the vehicle. The forwardly projecting ends of bell cranks 28 are interconnected with the sides of the steering fork 26 by retractile coil springs 31, as shown. The arrangement is such that the front wheel 12 of the vehicle is resiliently suspended on the steering fork 26, as should be obvious. The steering fork 26 has a rearwardly and upwardly inclined steering extension 32 formed integral therewith, and terminating at its upper end in a steering handle 33, spaced somewhat above the forward end of the rectangular frame 10.

A main traction wheel 34 for the vehicle is provided, and this wheel is considerably larger than the other two wheels of the vehicle and is preferably provided with a relatively soft oversize balloon pneumatic tire, so as to afford maximum traction without damaging the turf of the golf course. The traction wheel 34 is disposed near and inwardly of one side of the frame 10, and is journaled for rotation as at 35 upon an independent vertically swingable generally U-shaped wheel suspension yoke 36. The yoke 36, Figure 7, comprises sides 37 and 38, having their forward ends rigidly secured by welding or the like to a horizontal sleeve 39, journaled upon the horizontal transverse frame member 20. The traction wheel 34 is disposed between the sides 37 and 38 of the suspension yoke, and the traction wheel is connected with the yoke 36 near the longitudinal center of such yoke. As best shown in Figure 2, the rear portion of the yoke 36 is upwardly inclined, whereas its forward portion is horizontal and disposed at the elevation of the horizontal member 20. A rear closed horizontal extremity 40 of the suspension yoke 36 is arranged just forwardly of the vertical frame members 14, at an elevation above the axle of the traction wheel 34. A strong compressible coil spring 41 has its lower end bearing upon the yoke extremity 40, and its upper end bearing upon a member 42 which is rigid with the top of the frame 10. Means 43 may be provided to adjust the tension of the coil spring 41, if preferred, but no such adjusting means is necessary, and it may be omitted if preferred. The mounting of the traction wheel 34 is such that it may rise and fall relative to the rigid frame 10 while passing over obstructions in the ground, as should be obvious.

The means to drive the traction wheel 34 comprises a battery powered electric motor 44, having forward casing extensions 45, freely pivotally secured to the horizontal transverse frame member 20. The frame member 20 thus supports the forward end of the electric motor 44 and associated elements to be described. The motor 44 has a gear box or speed reducer unit 46 rigidly secured to its rear end, and supported by and operatively connected with the driven axle 47 of traction wheel 34. The traction wheel thus supports the rear end of the driving motor 44 and speed reducer. As shown diagrammatically in Figures 3 and 4, the armature shaft of the motor 44 has a pinion gear 48 mounted thereon, meshing with a larger gear 49 of speed reducer 46, and in turn driving a worm gear 50 of the speed reducer, which meshes with a worm wheel 51, rigidly secured to the driven axle 47 of the traction wheel 34. Thus, the traction wheel is driven directly through the medium of the motor 44 and speed reducer 46, as described.

It may now be observed that the entire driving unit for the traction wheel 34, including motor 44 and gear speed reducer 46, may rise and fall with the traction wheel, since both the wheel 34 and motor 44 are pivoted to the fixed horizontal frame member 20 for vertical swinging movement relative thereto. Consequently, when the traction wheel 34 rises and falls, as when travelling over rough terrain, this has no effect whatsoever upon the positive engagement of the gears 50 and 51 and associated elements. The traction wheel 34 is independently suspended upon the frame 10, as previously described, and the electrical driving unit for the traction wheel is suspended with it for rising and falling movement, as may occur during the operation of the vehicle.

The other rear wheel 52 of the vehicle is a much smaller pneumatic tired wheel than the traction wheel 34, as shown in the drawings. The wheel 52 is arranged opposite the traction wheel 34, near the rear of the vehicle, and inwardly of the opposite frame member 12, Figure 7. The wheel 52 is likewise independently suspended from the frame 10, and has no direct connection with the traction wheel 34, so that the need for any differential gearing is entirely dispensed with. The small rear wheel 52 is journaled at 53, Figure 5, upon a vertically swingable independent suspension frame 54, braced as shown in Figure 5, and having its forward end rigidly secured to a horizontal sleeve 55, freely journaled upon the horizontal transverse frame member 20. The wheel 52 is disposed outwardly of the suspension frame 54, Figure 7, but inwardly of the adjacent longitudinal frame member 12. The rear end of pivoted suspension frame 54 carries a U-shaped lateral extension 56, rigid therewith, which extension supports the lower end of a compressible coil spring 57, having its upper end bearing against a member 58, rigidly secured to the main frame 10, see Figure 3. The small rear wheel 52 is thus suspended entirely independently of the wheels 34 and 30, and it may now be seen that each of the three wheels of the vehicle are independently and resiliently suspended. Each of the three wheels may thus rise and fall independently when the vehicle travels over rough terrain.

A suitable number of storage batteries 59, Figures 2 and 3, are supported inside of the frame 10 upon suitable horizontal members 60, rigid with the frame. Some of the batteries 59 may be arranged above the smaller rear wheel 52 and forwardly thereof in the corner space 61 along the upper right hand corner of the frame 10, Figure 3. An additional battery or batteries 59 may be mounted within the space 62, across the upper forward corner of the frame 10, Figure 2. This arrangement is compact and space-saving, and the weight of the batteries 59 is distributed upon the frame 10 so as to balance and impart stability to the vehicle. The batteries along the space 61 and above the rear wheel 52 tend to counterbalance the weight of the large traction wheel 34 and associated driving motor 44 and connected elements. The wires and connecting elements from the several batteries to the electric motor 44 are merely conventional, and have been omitted from the drawings for the purpose of simplification. In like manner, the controls for the vehicle including any speed controls, brakes and the like have also been omitted from the drawings for the purpose of simplification. Such controls as may be necessary are merely conventional and thus form no part of the present invention.

As shown in Figures 1, 5 and 6, the frame 10 is enclosed around all four of its sides with suitable panels 63, 64, 65 and 66. These panels may be secured to the frame 10 by any suitable conventional means, and the several panels are preferably demountable from the frame 10 to facilitate servicing the vehicle. If desired, the side panel 63 may have an access door 67 adjacent to the battery space 62, and the side panel 64 may likewise have access doors 68 and 69 adjacent to the battery spaces 61 and 62.

The top of the frame 10 is also covered by a suitable panel 70, preferably coextensive with the top of the rectangular frame 10, and a major portion of the top panel 70 along one side of the vehicle is utilized as a seat, which is preferably cushioned by a slab of foam rubber or the like as shown at 71. The seat cushion 71 is elongated and generally rectangular, as shown in Figure 6, and preferably covers at least one-half of or slightly more than one-half of the top horizontal panel 70. The seat cushion 71 may be separately formed and removable from the top panel 70 or it may be permanently secured thereto, if preferred. A cushioned seat back 72 is also provided along the inner longitudinal side of seat cushion 71, and extending thereabove at right angles thereto throughout a major portion of the length of the same. The seat back 72 is rigidly secured to either the top panel 70 or the seat portion 71, as found desirable, and variations of the construction in this regard are contemplated. The seat back 72 preferably terminates somewhat rearwardly of the forward end of the seat 71 as shown in Figures 5 and 6.

A continuous step or running board 73 projects horizontally from the bottom of the rigid frame 10 along the side of the same below the seat 71, and across the rear end of the vehicle as shown at 74. A portion of the step or running board also extends forwardly of the frame 10 adjacent to the seat 71, as at 75, and this step portion 75 is also rigid with the forward frame extension 23 previously described. A small step section 76 may also be provided at the bottom of the frame 10 on the opposite forward corner of the vehicle if desired. The entire step or running board is horizontal and at one elevation, adjacent to the bottom of the frame 10.

The seat and step arrangement is such that the golfer may conveniently sit "side saddle" upon the vehicle, with his feet upon the running board portion 73 and his back against the seat back 72. A golf bag or bags may be conveniently supported upon the rear step portion 74 as indicated in Figure 1. If the golfer cares to, he may face forwardly while seated upon the seat 71, and he may place his feet upon the forward portion 75 of the step or running board. The construction of the seat and running board is such that there are no obstructions in the way of the golfer when he is boarding the vehicle or stepping from it. He may merely sit down upon the seat 71 and grasp the steering handle 33 and he is ready to travel from one place to another upon the golf course. The arrangement differs in this respect markedly from conventional golfers' vehicles, in that the conventional vehicles require the golfer to step up onto a floor forwardly of the driver's seat and then to sit down behind a steering device, much the same as a driver must step into and out of the front seat of an automobile. With the present construction, the golfer, after placing his clubs or golf bag upon the vehicle and attaching them thereto can merely be seated or arise from the side facing seat 71 with the greatest of ease, and without the necessity of placing his legs or knees in a separate compartment or under a steering wheel or the like.

The vehicle is designed for extreme ease of operation, maximum compactness, simplicity and ruggedness or strength. The independent wheel suspension renders the vehicle comfortable and free from vibrations and rocking or rolling motions on rough terrain. The arrangement whereby the driving motor 44 and associated elements is pivoted to the member 20, together with the main traction wheel 34, is a distinct feature of the invention, which renders the construction of the driving means much more simplified than conventional constructions.

It is believed that the foregoing description, taken in connection with the drawings, will render the numerous advantages of the instant vehicle readily apparent without a further discussion herein.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. A vehicle for golfers comprising, an upstanding frame which is elongated in the direction longitudinally of its direction of travel, said frame having a generally horizontal top which is generally seat-high from its bottom, a front steering wheel mounted upon the forward end of the frame, a handle connected with the steering wheel to steer it and arranged adjacent to the front end of the top, a pair of rear wheels mounted upon said frame and extending downwardly below said bottom, one rear wheel being arranged inwardly of and near one longitudinal side of the frame and the other rear wheel being arranged inwardly of and near the other longitudinal side of the frame, one rear wheel having a tread which is wider than the tread of the other rear wheel, said rear wheels being transversely spaced, means to drive the rear wheel with the wider tread independently of the other rear wheel, a seat carried by said top and extending substantially through the length of said top and extending transversely over the rear wheel with the wide tread and spaced from the other rear wheel, a back mounted upon said top and arranged adjacent to the inner edge of said seat, and a horizontal step secured to the bottom of said frame along the side of the frame adjacent to the outer side of the rear wheel having the wide tread, said step extending longitudinally throughout the length of said frame and also extending transversely of the rear end of said frame.

2. A vehicle for golfers comprising, an upstanding frame which is elongated in the direction longitudinally of its direction of travel, said frame having a generally horizontal top which is generally seat-high from its bottom, a front steering wheel mounted upon the forward end of the frame, a handle connected with the steering wheel to steer it and arranged adjacent to the front end of said top, a pair of rear wheels mounted upon said frame and extending downwardly below the same, one rear wheel being arranged inwardly of and near one longitudinal side of the frame and the other rear wheel being arranged inwardly of and near the other longitudinal side of the frame, one rear wheel having a tread which is wider than the tread of the other rear wheel, said rear wheels being transversely spaced, means to drive the rear wheel with the wider tread independently of the other rear wheel, a seat carried by said top and extending substantially throughout the length of said top and extending transversely over the rear wheel with the wide tread and spaced from the other rear wheel, and a horizontal step secured to the bottom of said frame along the side of the frame adjacent to the outer side of the rear wheel having the wide tread, said step extending longitudinally throughout the length of said frame.

References Cited in the file of this patent

UNITED STATES PATENTS

| | | |
|---|---|---|
| D. 148,040 | Steel | Dec. 2, 1947 |
| 1,607,236 | Bumstead | Nov. 16, 1926 |
| 2,463,972 | Jackson | Mar. 8, 1949 |
| 2,589,793 | Franks | Mar. 18, 1952 |
| 2,636,567 | Landrum | Apr. 28, 1953 |
| 2,675,892 | Wagner | Apr. 20, 1954 |
| 2,685,777 | Plas | Aug. 10, 1954 |
| 2,749,997 | Deslippe | June 12, 1956 |
| 2,822,969 | Cooper | Feb. 11, 1958 |